United States Patent [19]

Pekar et al.

[11] 4,362,447
[45] Dec. 7, 1982

[54] STEAM GENERATOR TUBESHEET FACE MACHINING APPARATUS

[75] Inventors: Frank M. Pekar, Pensacola, Fla.; Frank W. Cooper, Jr., Monroeville, Pa.

[73] Assignee: Westinghouse Electric Corp., Pittsburgh, Pa.

[21] Appl. No.: 61,227

[22] Filed: Jul. 27, 1979

Related U.S. Application Data

[63] Continuation of Ser. No. 896,869, Apr. 17, 1978, abandoned.

[51] Int. Cl.³ .......................... B23C 1/20; B23B 3/22; B23F 21/03
[52] U.S. Cl. ................................. 409/200; 51/241 S; 82/4 C; 409/211
[58] Field of Search ............... 409/178, 179, 175, 200, 409/204, 211; 82/4 R, 4 C; 408/236, 237, 234 A; 51/120, 241 S, 241 A

[56] References Cited

U.S. PATENT DOCUMENTS

| | | | |
|---|---|---|---|
| 2,718,820 | 9/1955 | Faselt | 409/211 |
| 3,158,065 | 11/1964 | Korenek et al. | 409/179 X |
| 3,273,432 | 9/1966 | Hasund | 82/4 R |
| 3,630,109 | 12/1971 | MacMichael | 82/4 C |
| 3,687,007 | 8/1972 | Harris | 409/178 |
| 3,848,371 | 11/1974 | Dillinger | 51/241 S |

Primary Examiner—Harrison L. Hinson
Attorney, Agent, or Firm—Daniel C. Abeles

[57] ABSTRACT

An adjustable face milling cutter is carried on a turntable rotatable about a central axis that is coaxial with the cylindrical shell of the steam generator in which the tubesheet is located, to machine a circular path on the upper tubesheet surface. For complete circle-by-circle scanning of the tubesheet surface, the radius of the circular machined path is variable by virtue of mounting the milling cutter on the outer periphery of a circular mounting member turnable to different locked rotary positions about an off-center pivot axis on the turntable. The rotary support for the turntable is at its outer periphery, as provided by an encircling support ring which in turn is supported by a ball bearing assembly having an inner race secured to the turntable top and an outer race secured to the support ring top; teeth on the inner race being provided to accommodate a motor-operated drive gear. The support ring is centered in the steam generator shell by jack screws and is supported by such shell via a circular array of support lugs welded to the inner wall of such shell.

3 Claims, 4 Drawing Figures

STEAM GENERATOR TUBESHEET FACE MACHINING APPARATUS

CROSS-REFERENCE TO RELATED APPLICATIONS

This is a continuation of application Ser. No. 896,869, filed Apr. 17, 1978, now abandoned.

Commonly-assigned U.S. application Ser. No. 809,588, filed June 24, 1977, now U.S. Pat. No. 4,173,060.

BACKGROUND OF THE INVENTION

This invention relates to apparatus for effecting retubing of a steam generator in a nuclear power plant.

Nuclear reactor power plants utilize a steam generator having a tube bundle to transfer heat from a primary side reactor-heated-liquid to water on a secondary side to form steam for driving a turbine. Condenser leaks in the power plants have caused circulating water, which is often brackish, to mix with the secondary-side water in the steam generator, resulting in the build-up of undesirable chemicals in the tube bundle. Water treatment and blowdown have not completely protected the steam generator tubes from corrosion and leaks. As the number of tubes subject to such leaks increases, the desirability of replacement or repair of the steam generator increases. Since removal of a steam generator intact from a nuclear power plant requires removal of a large portion of a reinforced concrete containment vessel, replacement of such generator in such manner becomes time consuming, expensive, and therefore undesirable.

SUMMARY OF THE INVENTION

In on-site retubing of a nuclear plant steam generator, it has been proposed in U.S. patent application Ser. No. 809,588, filed June 24, 1977, for example, to remove a top portion of the steam generator shell to gain access to the tube bundle for removing same. Following removal of the tube bundle tubes for replacement, it becomes important to determine the condition of the tubesheet, as to its external and internal structural integrity. The upper face machining apparatus of the present invention provides for removal of surface material from the tubesheet for examination as to cracks or crazes and/or for introducing a limited degree of surface reorientation that may be necessary to obtain uniform tubesheet thickness, for example. Construction features of the apparatus of the present invention imbue this apparatus with a high degree of use convenience and operational accuracy. Among such construction features is the turntable that carries the milling cutter supported for rotation about its central axis by a large ring-shaped ball bearing assembly, and a mounting member for the milling cutter that is turnable to different lockable rotary positions about a pivot axis on the turntable to change the cutting radius for the milling cutter.

BRIEF DESCRIPTION OF THE DRAWINGS

Still other features and advantages of the invention will become apparent from the subsequent and more detailed description, when taken in connection with the accompanying drawings, in which.

DESCRIPTION OF THE PREFERRED EMBODIMENT

Figure 1:
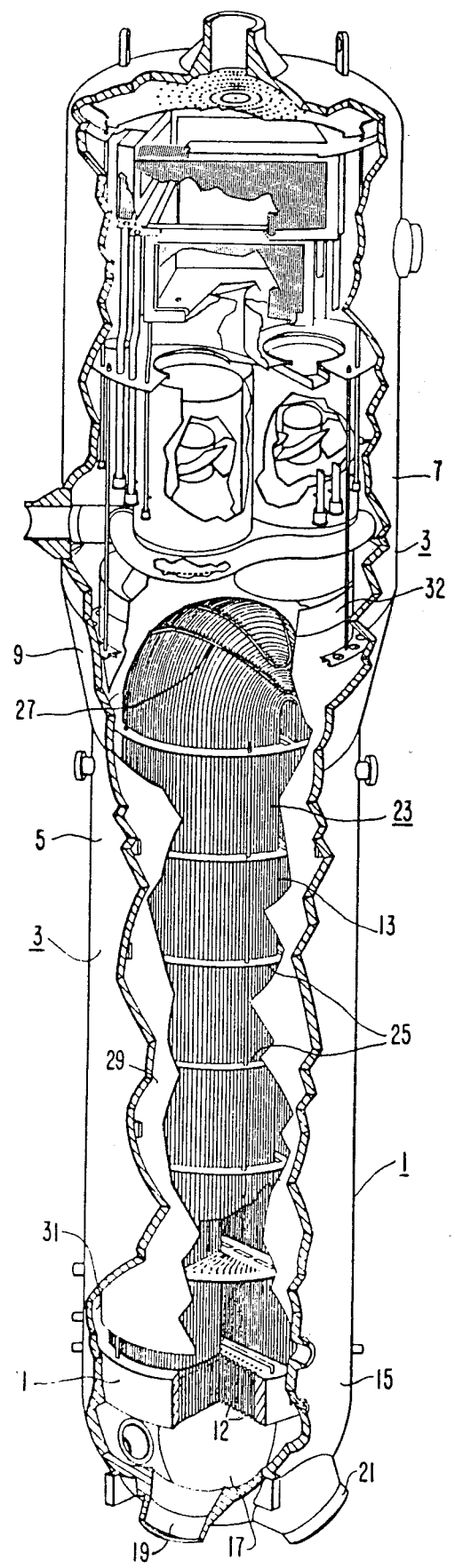
FIG. 1 is a vertical perspective view of the tube-containing portion of a nuclear power plant steam generator shown partially in section.

Referring to FIG. 1 in the drawings, the steam generator 1 with which the tubesheet face machining apparatus of the present invention is intended to be employed in connection with replacement of the tube bundle 23 therein typically includes a vertically oriented shell 3 having a lower cylindrical portion 5, an upper cylindrical portion 7, larger in diameter than the lower portion, and a frusto-conical transition portion 9 joining the lower and upper portions 5 and 7. A tubesheet 11 is disposed in the lower end of the lower portion 5 of the shell and has a plurality of holes 12 for accommodating the ends of U-shaped tubes 13 which extend upwardly from the tubesheet 11 and are closely packed to form the tube bundle 23 disposed vertically within the lower portion 5 of the shell 3.

A hemispherical channel head 15 is fastened to the tubesheet 11 and has a divider plate 17 disposed therein. A primary fluid inlet nozzle 19 supplies heated affluent primary fluid from a nuclear reactor core (not shown) to one portion of the channel head 15 and a discharge nozzle 21 is disposed in the channel head 15 to return the affluent primary fluid to such reactor core.

A plurality of support plates 25 are disposed throughout the tube bundle 23 to support the tubes 13 at various locations along their length to reduce flow-induced vibrations. Anti-vibration bars 27 are also disposed adjacent to the bends in the tubes 13 to prevent vibration in this portion of the tube bundle 23.

A wrapper or sleeve 29 is disposed between the tube bundle 23 and the shell 3 so as to form an annular space 31 therebetween. The upper part of the upper section 7 of the shell as shown in FIG. 1 has been removed to gain access to the interior of the steam generator in preparation for removal and replacement of the tube bundle therein. Various components of the steam generator usually disposed in the upper section 7 of the shell 3 also have been removed from the steam generator as shown in FIG. 1 to provide access to the top of the sleeve 29 encircling the tube bundle 23.

Typical operation of the steam generator, which per se forms no part of the present invention, involves the flow of heated primary fluid from a nuclear reactor core upwardly through the tubesheet 11 and one branch of the U-shaped tube bundle 23 and downwardly through the other branch of such tube bundle and bark through the tubesheet 11 to the discharge nozzle 21, while secondary fluid above the tubesheet 11 and outside the tube bundle 23 becomes heated to form steam for conveyance by conduit means (not shown) to a turbine (not shown) operated by such steam.

Figure 2:
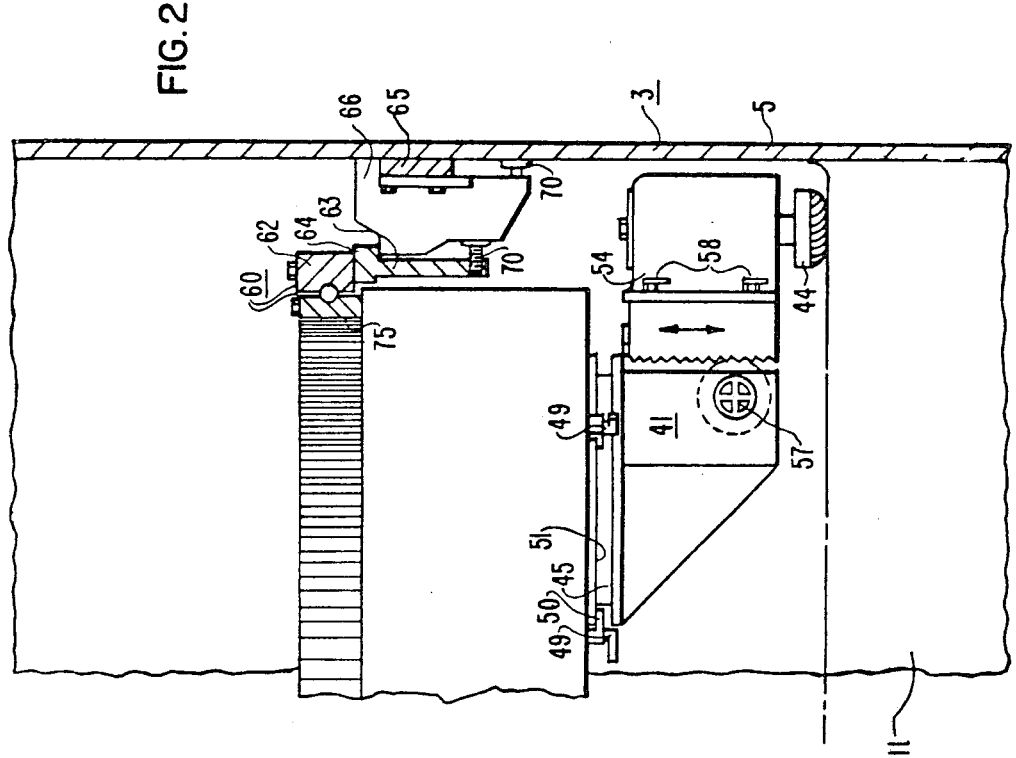
FIG. 2 is a vertical view partly in outline and partly in section, showing a preferred embodiment of the present invention affiliated with the shell and tubesheet of a steam generator such as shown in FIG. 1 from which the tube bundle depicted in such FIG. 1 has been removed.
Figure 2:
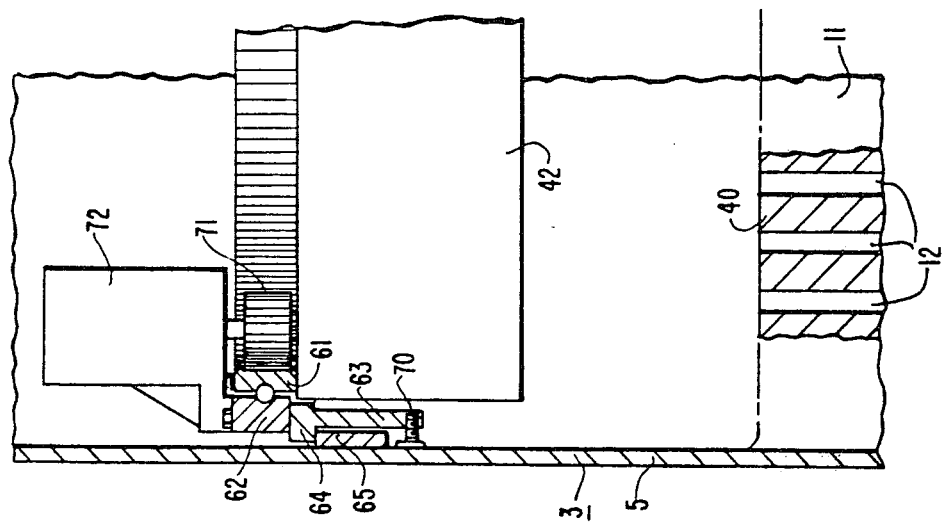
Figure 3:
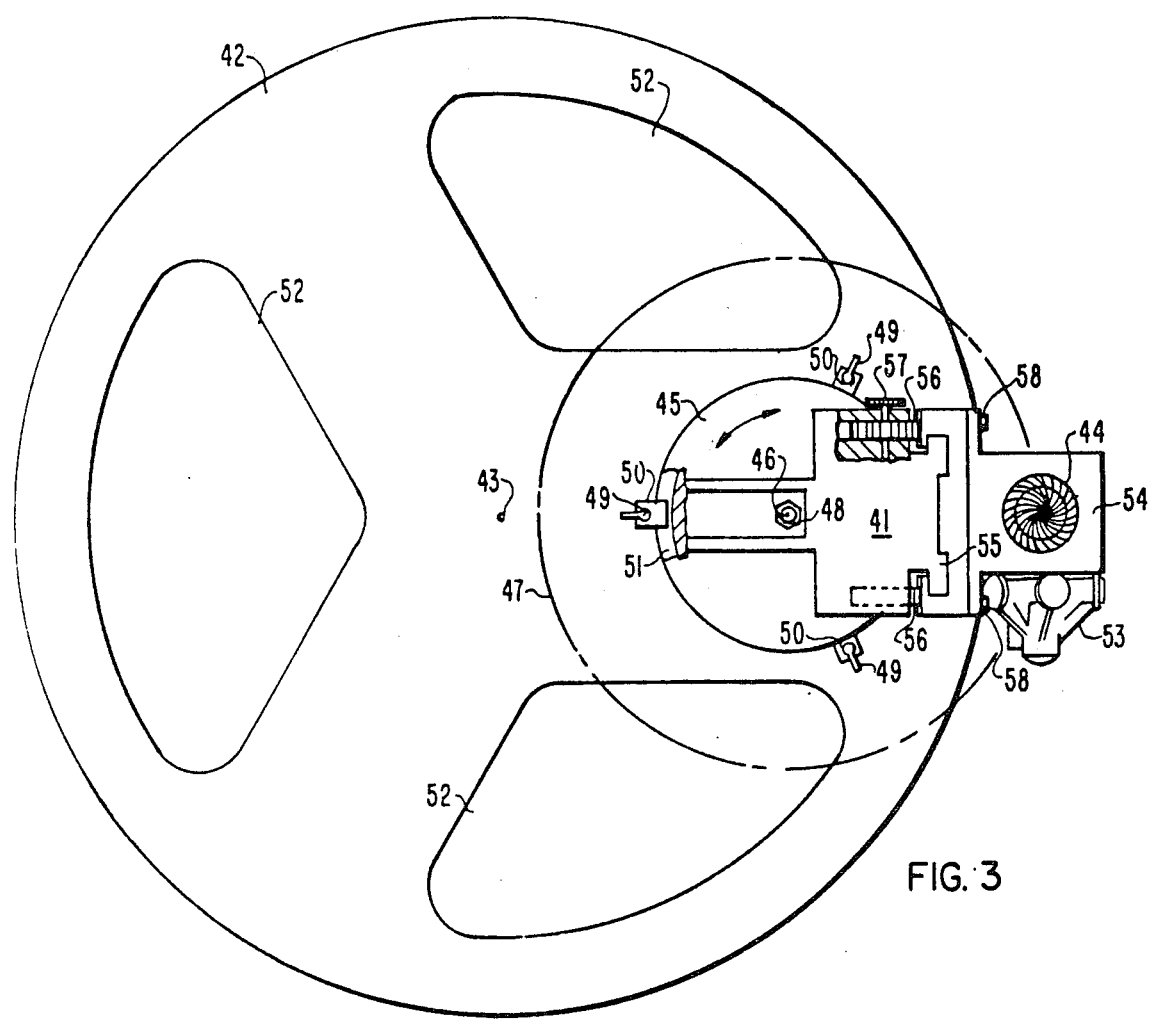
FIG. 3 is a bottom view of the apparatus of FIG. 1.

Referring to FIGS. 2 and 3 in the drawings, the machining apparatus of the present invention is affiliated with the lower section 5 of the shell 3 of the steam generator shown in FIG. 1, for machining the upper surface 40 of the tubesheet 11 disposed in such steam generator. In accordance with the presently preferred embodiment, such apparatus comprises a face milling cutter assembly 41 carried on the lower face of a turntable 42 disposed above and parallel to the upper surface 40 of the tubesheet 11. By rotation of the turntable 42 about its central axis 43, a milling cutter head 44 at the lower end of the cutter assembly 41 is caused to machine a circular path on the upper surface 40 of the tubesheet 11. The milling cutter assembly 41 depends from a circular mounting member 45 adapted to assume different lockable rotary positions about a vertical pivot axis 46 located on the turntable 42 at one side of its axis of rotation 43. The cutter assembly 41 is so constructed and arranged that the cutter head 44 occupies the position near the outer periphery of the circular mounting member 45 so that as the rotary position of such mounting member is changed about its pivot axis 46, the radial position of the milling cutter head 44 with respect to the turntable axis 43 is also correspondingly changed. The path along which such cutter head 44 may be positioned about the pivot axis 46 is shown schematically in FIG. 3 as the circular dot-dash line 47. It will be understood that in each selected rotary position of the cutter head 44 about the pivot axis 46 of mounting member 45, the turntable 42 will make at least one turn about its central axis 43 to cause a circular machining cut to be made on the upper surface 40 of the tubesheet 11. By suitable choice of such rotary positions for the cutter 44 about the pivot axis 46 and the corresponding choice of rotations of the turntable 42 about its central axis 43 the entire upper surface of the tubesheet 11 may be scanned by the cutter head.

The pivot axis 46 for the mounting member 45 may be defined by a vertical shaft 48 extending downwardly from the turntable. To lock the circular mounting member 45 in any one of its selected rotary positions about the pivot axis 46, a plurality of manually-actuable locking screws 49 are provided that include finger members 50 cooperable with a shoulder 51 in the mounting member 45 to urge such member into locking engagement with a machined surface on the underside of the turntable 42. Operating personnel (not shown) located above the turntable 42 may effect such repositioning of the mounting member 45 for the cutter assembly 41, including locking and unlocking the screws 49 manually, by way of a plurality of through openings 52 extending downwardly through the turntable 42.

The cutter assembly 41 includes such as an hydraulic drive motor 53 operatively connected to the cutter head 44 through the medium of a gear drive mechanism 54. The motor 53, gear mechanism 54, and cutter head 44 are mounted on vertical guide members 55 affiliated with a downwardly extending pedestal part of the assembly to permit adjustment in the vertical positioning of the cutter head 44 to control depth of cut, for example, during machining of the upper surface 40 of the tubesheet 11. To facilitate such vertical adjustment a rack and pinion arrangement 56 operated by a hand wheel 57 is provided. Locking screws 58 provide for securing the cutter head 44 and its drive members in selected vertical positions on the guide members 55. It would be appreciated that the depth of cut adjustment for the cutter head 44 as effected through operation of the hand wheel 57 and of the locking screws 58 will be effectuated manually by way of the through openings 52 in the turntable 42; the rate of rotation of such turntable during operation of the equipment being relatively slow so that the depth of cut adjustment can be made during such turntable rotation, if desired.

The turntable 42 is adapted for turning movement about the central axis of the steam generator shell 3 by way of a large diameter ball bearing assembly 60 having an inner race 61 bolted to the top of the turntable 42 at its outer periphery and an outer annular race 62 that is bolted to the top of a support ring 63 that encircles the turntable 42. The support ring 63 includes an annular flange portion 64 that either directly or indirectly rests on a plurality of support lugs 65 that are welded to the interior of the steam generator shell 3 and disposed in spaced-apart circular array at a selected height above the upper surface 40 of the tubesheet 11. The machining apparatus of the present invention is adapted to be employed with different steam generator shell diameters, such as thirty-three inch, fifty-one inch, forty-four inch, etc. In the case of the smaller diameter, the annular flange 64 of the support ring 63 will rest directly on top of the support lugs 65 welded to the generator shell as shown in the left-hand portion of the drawing in FIG. 2. By the use of spacer members 66 removably attached to the lugs 65 welded to the tube shell 3, as shown in the right-hand portion of the drawing of FIG. 2, the machining apparatus can be adapted for operation in the larger sizes of such generator shell. For centering of the support ring 63 within the shell 3, and thereby centering the turntable 42 coaxially within such shell, a plurality of jack screws 70 are provided.

For effecting turning of the turntable 42 to obtain the feeding of the rotating cutter head 44 along its circular paths atop the tubesheet 11, the apparatus is provided with a drive gear 71 operated by a motor 72 mounted on the outer ring 62 of the ball bearing assembly. The drive gear 71 cooperates with teeth 75 formed in the inner periphery of the inner race 61 of the ball bearing assembly 60.

It will be apparent from the foregoing that other tools may be substituted for the milling cutter head 44. For example, in some circumstances it may be desirable to provide for reboring of the tube holes 12 in the tubesheet 11, in which case a drilling or boring tool would be substituted for the face milling cutter head 44.

Figure 4:
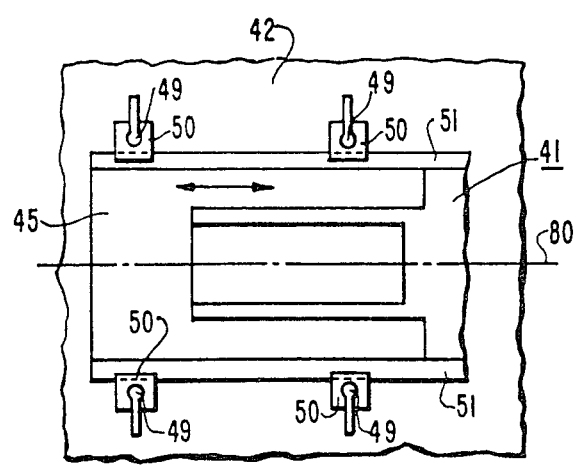
FIG. 4 is an alternate mounting arrangement for a machining tool assembly of the apparatus of FIGS. 2 and 3.

Referring to FIG. 4, rather than being turnable about the pivot axis 46, the mounting member 45 may be reconfigured and made positionable along a straight-line radial path 80 on the turntable 42 to change the radius of the circular cutting path taken by the cutter head 44 during machining operation.

Having now described the invention, what is claimed as new and desired to be secured by Letters Patent is:

1. Apparatus for machining the face of a tubesheet disposed in a steam generator shell from which the tubes have been removed, comprising,
 primary support means adapted to be welded to the inner wall of said steam generator shell,
 secondary support means removably attached to said primary support means, including adjustable centering means and a large diameter anti-friction bearing having a non-rotatable outer bearing race and a rotatable inner bearing race,
 a circular turntable disposed parallel to the aforesaid tubesheet face and removably attached at its outer periphery to said rotatable inner bearing race,
 a machining tool assembly disposed on a face of said turntable adjacent to said tubesheet for machining the corresponding face thereof during rotary movement of said turntable, mounting means for said machining tool assembly constructed and arranged to permit adjustment in the radial position of such assembly on said turntable, said mounting means being rotatable about a pivot axis on said turntable to effectuate the aforesaid radial position adjustment of said machine tool assembly, and power operated drive means for turning said turntable during operation of said machining tool assembly.

2. The apparatus of claim 1, wherein said secondary support means includes a support ring encircling said turntable having the inner bearing race formed around the outer circumference thereof, and wherein said power-operated drive means includes gear teeth encircling the inner circumference of said support ring.

3. The apparatus of claim 1 including spacer means adapted to be supported by the primary support means and to support the secondary support means and disposed therebetween, said spacer means being sized to accommodate the difference between the interior diameter of the steam generator shell and the outside diameter of the secondary support means.

* * * * *